United States Patent
Isaacs et al.

[15] 3,699,222
[45] Oct. 17, 1972

[54] PRODUCTION OF VIRAL INTERFERING SUBSTANCES

[72] Inventors: Alick Isaacs, London, England; Jean Lindenmann, Gainesville, Fla.

[73] Assignee: National Research Development Corporation, London, England

[22] Filed: Aug. 5, 1968

[21] Appl. No.: 757,188

Related U.S. Application Data

[63] Continuation of Ser. No. 575,470, Aug. 26, 1966, abandoned, which is a continuation of Ser. No. 183,413, March 29, 1962, abandoned, which is a continuation-in-part of Ser. No. 734,106, May 9, 1958, abandoned.

[30] Foreign Application Priority Data

March 11, 1958 Germany..........P 10 62 391.3

[52] U.S. Cl....................................................424/85
[51] Int. Cl........................................A61k 27/00
[58] Field of Search.........................................424/85

[56] References Cited

OTHER PUBLICATIONS

Burke et al., British Journal of Experimental Pathology, Vol. 39, pages 78– 84, Feb. 1958.
Finter, Interferons, published by North–Holland Publishing Co., 1966, Amsterdam, pages 33, 36, 37, 233, 235, 238, 241, 245, 246, and 260.
Henle et al., American Journal of Medical Science, Vol. 207, page 714, 1944.
Lindenmann et al., British Journal of Experimental Pathology, Vol. 38, pages 551– 562, Oct. 1957.
Wolstenholme et al., Interferon, published by Little, Brown and Company, 1967, Boston, pages 210– 215.

*Primary Examiner*—Richard L. Huff
*Attorney*—Albert L. Jacobs

EXEMPLARY CLAIM

1. Interferon.

4 Claims, No Drawings

PRODUCTION OF VIRAL INTERFERING SUBSTANCES

This invention is concerned with the production of viral interfering substances.

Viral interference is a phenomenon in which one virus interferes with the growth of a second virus in living tissues or cells. This interference is not an immunological effect and may occur when the interfering virus is non-infective.

We have found that during the induction of viral interference by non-infective virus, a viral interfering substance distinct from the non-infective virus is produced. The viral interfering substance, which we call Interferon, is formed by the interaction of non-infective virus and living cells, and its activity may be recognized by its ability to inhibit the growth of living viruses.

The production of Interferon is essentially a property of the virus/cell system as a whole and, not surprisingly, different virus/cell systems show quantitative differences in the yield of Interferon they are able to produce. It has further been observed that the antiviral substances produced in different virus/cell systems exhibit some variation in biological properties depending largely on the species of cell in which they are produced. Thus, although Interferon exhibits very broad spectrum antiviral activity it is usually found most active when tested in the cells of the same species as the cell in which it was itself produced. The degree of specificity shown by Interferon is most difficult to interpret in physico-chemical terms because the complex molecular structure of Interferon is not yet fully understood, and it will therefore be appreciated that the term "Interferon" is best regarded as a generic term to be qualified in a particular case to indicate its origin, for example, by the use of such terms as monkey kidney Interferon, chick Interferon, calf kidney Interferon.

The production of Interferon can be explained in the light of the biological concept of avirulence, a term which eludes definition with absolute precision but which is well understood by virologists. A virus which is fully virulent with respect to a particular species of cell will enter the cells and cause the cells to replicate more virus by taking over cellular processes which are normally necessary to maintain the life of the cell and its reproduction. Virulent viruses therefore cause early death of the cells with the accompaniment of familiar cytopathic effects. Many methods are known of modifying virulent viruses to decrease their infectivity for a particular cell system and the application of such methods will give the virus varying degrees of avirulence. The less inefective, i.e. the more avirulent, a virus becomes the less its power of reproduction in the cells in which it is incubated, and in parallel with this tendency to reduce virus-multiplication there is an increase in the capacity of the system to produce Interferon. Consequently, to obtain Interferon most efficiently virus/cell systems will b used in which the relationship of the virus (modified as described hereinafter in further detail) to the cells is one of substantial non-infectivity or high avirulence.

Accordingly, the present invention provides a process for the producing of a viral interfering substance which comprises incubating a virus in living vertebrate animal cell or tissue material in an aqueous medium preferably in the presence of oxygen, said material being one for which the virus has a sufficiently high degree of avirulence substantially to avoid destruction of said material by the virus and to induce production of a viral interfering substance, continuing the incubation until the viral interfering substance is liberated into the aqueous medium and recovering the viral interfering substance from the aqueous medium.

A temperature of 35–37°C. and a pH at or near neutrality are usually employed for the incubation.

The amount of interferon produced depends upon the amount of inactivated virus employed, and a second crop can be taken from the living material on re-incubation with further inactivated virus.

Some degeneration of the cell material will often occur at or near the end of the tissue culture process of this invention, but this is because in such a system the cell are growing under unnatural conditions and cannot be made to persist indefinitely. It is important, however, to distinguish this type of degeneration which is inherent in the tissue culture method from the cell destruction caused by virulent virus which must be avoided if a viral interfering substance is to be produced in a substantial quantity.

The living animal cell material or tissue in which the virus is incubated so as to liberate Interferon spontaneously into the medium may be, for example, chick chorio-allantoic membranes, chick embryo fibroblasts, monkey kidney cells, rabbit kidney cells, human amnion or human thyroid cells or a cell line from human carcinoma. Each of these living materials has its own optimum cultural conditions as is well known in virology. From what has been stated above with regard to specificity, Interferon prepared in cells of primate origin will understandably be preferred for use in the study and understanding of virus diseases. However, differences in potency of Interferons from different sources may often be counterbalanced by the amount of the dose given. With regard to the virus, Interferon may be made, for example, from the B/England, Melbourne, A/Singapore and Kunz strains of influenze virus, (killed or live), the viruses of mumps, Newcastle disease of fowls, vaccinia, fowl plague, Chikungunya virus, Sendai viruses and herpes virus. Polio virus, rabies and foot and mouth viruses will also produce interferon.

The degree of avirulence which the virus must possess in relation to the cell system frequently develops spontaneously in the course of growing the supply of virus to be used as inoculum. Again, the procedures of producing the cell material in the most suitable form for subsequent processing often involve prolonged periods of incubation under conditions which tend to confer some resistance on the cell themselves.

The inactivation of the virus (especially the myxo viruses mentioned above) from the infective state to the non-infective state may be carried out by other known methods, for example, by heating or by subjecting it to ultra-violet light. The inactivating treatment is generally such as to abolish or greatly reduce the infectivity of the virus, whilst retaining its interfering activity. With influenza viruses, for example, heat treatment at 56°C. for 1 hour is sufficient for this purpose; heating to 60°C. would destroy the interfering activity of this virus. Mixtures of heat or ultra-violet inactivated virus and virus of inherently low virulence may also be used.

The procedure for the production of Interferon will generally be to inoculate the cell material or tissue with the non-infective virus, for example the Melbourne (1935) strain of influenza virus A, by incubating the cell material or tissue for a relatively short time, of the order of one to three or four hours, in a medium containing the virus. The cell material or tissue is then removed from the medium and washed free of it so that the virus is not carried into the fresh medium in which the cell material or tissue is thereafter incubated. In order to obtain good yields of Interferon adequate oxygenation of the cell material or tissue is necessary during incubation, which may be carried out in a buffered salt solution, for example Earle's solution (see R. C. Parker, "Method of Tissue Culture", 1950). This incubation is carried out, most advantageously at blood heat, for a relatively longer period, for example overnight, and the Interferon is spontaneously liberated into the medium. With heat-inactivated virus the bulk of the Interferon is liberated between 3 and 12 hours after commencing incubation, but with ultra-violet inactivated virus liberation may continue for 2 or 3 days.

The medium containing Interferon is then separated from the cell material or tissue and may be treated in various ways to purify and/or concentrate the Interferon. Thus the Interferon may be precipitated from the medium by saturating it with ammonium sulphate. The precipitate may be dissolved in Earle's buffer solution. Ammonium sulphate carried into the buffer solution may then be removed therefrom by dialysis.

The Interferon in this solution or in the original medium may be purified by dialysis against a buffer solution; Interferon is stable at pH 2 and when so dialysed at this pH some material precipitates leaving Interferon in solution. Interferon is also stable under other pH conditions and is stable for at least two weeks at 2°C. It is inactivated by heating for 1 hour at 80°C. and pH 7.

The concentration of the Interferon in solution in the original medium or in a fresh solution after precipitation may be increased by pressure dialysis; through, for example, a Visking cellulose casing at a pressure of 600 mmg.Hg; the volume of the solution may be reduced 50-fold or more by this method, leaving Interferon within the dialysis sac. Freeze-drying methods can also be used.

Interferon can be distinguished from the original inactivated virus by several properties, namely its inability to agglutinate red blood cells, its resistance to the neutralizing action of viral antiserum, and its lower sedimentation rate. It is not measurably sedimented by centrifuging at 100,000 g. for one-half hour or 20,000 g. for 2 hours, although the same treatment removes all interfering activity from inactivated virus. Interferon is a protein with a relatively low weight.

The interfering activity of Interferon is greatly reduced by incubation with crystalline trypsin or pepsin.

The activity of the viral interfering substance may be measured by a biological test and it can be shown in the following way. The substance is mixed with pieces of chick chorio-allantoic membrane for 24 hours at 37°C. to allow interference to become established. It is then removed and the membrane pieces are incubated with live influenza virus. In such an experiment only a very low yield of virus will result as compared with control pieces of membrane not previously treated with viral interfering substance but similarly incubated with live influenza virus. The yield of virus is conveniently measured by the haemagglutinin titration test.

Interferon is active against viruses which are serologically completely unrelated to the strain of virus used to produce it. Thus, for example, Interferon inhibits the growth of the living viruses mentioned above and also the haemagglutinating virus of Japan (or Sendai virus) and vaccinia viruses. In the case of the activity of Interferon against vaccinia and other pock-producing viruses, the growth thereof may be estimated by a pock titration method in which the membrane or other living tissue in which the virus has been infected are extracted in a grinder and the extract inoculated on the chorion of 12 to 13-day developing hens' eggs and the resulting pocks counted after two to three days' incubation at 35°C. Alternatively its activity may be tested directly in fertile hens' eggs. It is active against cowpox and West Nile Encephalitis virus. Since the discovery of Interferon it has been shown to be effective in the animal body. Thus inhibition of the growth of vaccinia in the skin of rabbits and monkeys, inhibition of cowpox virus in the egg, protection of mice against encephalitis virus and protection of the rabbit eye against vaccinia have all been demonstrated.

The antiviral action of Interferon has also been strikingly observed in man. A number of volunteers received smallpox vaccinations at two sites in one arm instead of the usual single inoculation after having received previous intradermal injections of monkey kidney Interferon and a control preparation. Out of 35 cases 23 developed the characteristic lesion on the site that had received the control and no lesion on the site that had received the Interferon, while 7 cases experienced partial protection by Interferon as shown by the fact that the lesion developing at the protected site was much smaller than that on the unprotected site.

Interferon may be administered topically or parenterally.

The value of the viral interfering substance is that, whereas vaccines are not only very specific in their action but do not generally confer immunity upon the subject for some two weeks, Interferon is active against a variety of viruses and not only that virus from the inactivated form of which has been used in its preparation, and furthermore shows its activity in the subject to which it is administered within a matter of only a few hours.

The invention is illustrated in detail in the following examples. In some of the examples, increase of the degree of avirulence of the virus for the cells used is achieved by heat or ultra-violet irradiation; in others, the virus is inherently of low infectivity for the cells used or becomes sufficiently avirulent spontaneously under the conditions described.

EXAMPLE 1.

1. Virus. Influenza virus was grown in fertile hens' eggs and partially purified by adsorption on to chick red cells and elution into saline. The virus was then inactivated by irradiation with ultra-violet light.

2. Tissue. Chorio-allantoic membranes from 10- or 11-day incubated fertile hens' eggs were used. Ten membranes were placed in a flat Roux bottle of capacity 1 liter and to this were added 50 ml. of irradiated influenza virus diluted to a concentration corresponding to 1 ml. of virus-infected egg fluid ($10^{10}$ to $10^{11}$ virus particles) per membrane. The bottle was placed in a horizontal shaking machine delivering 86 to-and-fro strokes to the minute with an amplitude of about 1 inch. This bottle was then incubated at 37°C. for 3 hours, whereafter the membranes were removed, washed and placed in a fresh bottle with 50 ml. of a buffered salt solution (for example Earle's solution). The bottle was incubated overnight in the shaking machine at 37°C. and the fluid was removed.

3. Concentration and Purification of Interferon.

The Interferon may be concentrated and purified in a number of separate steps which may be applied serially or sequentially, for example:

(a) Interferon was precipitated by saturation with ammonium sulphate, the precipitate was dissolved in Earle's buffer solution and the ammonium sulphate removed by dialysis; (b) Interferon was stable at pH 2 and on dialysis against buffer at pH 2 some material precipitated leaving Interferon in solution; (c) further concentration was achieved by pressure dialysis; the volume being reduced 50-fold by this method leaving Interferon within the dialysis sac.

EXAMPLE 2.

The inactivated seed virus was prepared by irradiating 3 ml. of allantoic fluid containing the Melbourne strain of influenza virus in a 4 in. Petri dish with a maximum emission at 2,537 A. The haemagglutinating capacity of the inactivated virus preparation was determined by making serial two-fold dilutions of this material in 0.9 percent NaCl solution in 0.25 ml. volumes and adding an equal volume of 0.5 percent fowl red-cell suspension to each dilution. After settling at room temperature the sedimentation patterns were observed. One agglutinating unit was taken as the highest dilution giving partial agglutination, and the titres were expressed as the reciprocal of the initial dilutions of inactivated virus at the end point. The seeding of the 5 l. glass bottles containing the membranes was at the rate of 1,000 haemagglutinating units per membrane.

Eggs were incubated in large commercial incubators for 10 days, and the fertile eggs, after swabbing with 50 percent aqueous ethanol, were drilled through the end opposite the air sac. After removal of this part of the shell, the embryo, yolk sac and allantoic fluid were pulled out and discarded. The chorio-allantoic membranes were removed and placed in a beaker of Earle's medium (40 membranes per beaker). The Earle's medium at all stages were reinforced with 500 $\mu$g. of benzylpenicillin/ml. and 500 $\mu$g. of streptomycin sulphate/ml.

Each membrane was washed individually in more Earle's medium to clear it of yolk, albumin and blood, and 40 washed membranes were placed in a 5 l. bottle containing 200 ml. of medium. These bottles were seeded with ultraviolet irradiated Melbourne virus and rocked in a 37° incubator for 3 hours.

After incubation for 3 hours with seed virus, the membranes were removed from the bottles, washed in Earle's medium to remove surplus virus and put into further 5 l. bottles, each containing 200 ml. of Earle's medium. They were then rocked at 37° for 16–18 hours, when the first harvest was taken. The membranes were re-incubated as as before in Earle's medium solution in fresh 5 l. bottles for a second harvest.

The culture fluid containing Interferon was harvested in 500 ml. blood bottles and clarified by centrifuging at 320 g. for 20 minutes. The supernatent Interferon solution was removed and tested for sterility. The second harvest received identical treatment.

EXAMPLE 3.

Human amnion, monkey kidney (rhesus and cynomolgus) and rabbit kidney Interferons were made by infecting monolayer cell cultures with the Melbourne strain of influenza virus inactivated with ultraviolet light as described above for the preparation of chick Interferon. After 3 hours at 37°C. the virus was replaced by Earle's saline which was harvested after 24 hours at 37°C. Control preparations were made in the same way but without infecting the cells with irradiated influenza virus. The possibility that Interferon was produced in such control cell cultures by the action of a latent virus not producing degeneration of the cultures was not excluded but did not appear to have been present to any great extent as judged by the results. Interferon-containing solutions were dialysed against citrate buffer at pH 2.0 for 24 hours and then adjusted to pH 7.2.

Concentration of Interferon. Some Interferon preparations were concentrated approximately 10 times. This was achieved either by freeze-drying or by osmo dialysis using 40 percent polyethylene glycol (Carbowax 20,000 M or 4,000 M, Union Carbide Co.). Polyethylene glycol, especially the 4,000 average molecular weight material, diffused through the dialysis bags into the Interferon, but did not interfere with the measurement of Interferon either in vitro or in vivo. The interferons produced in this Example were active against the growth of vaccinia in the rabbit skin.

EXAMPLE 4.

Calf kidney cells were grown on six sides of Pyrex babies' feeding bottles, which were rotated in an incubator room maintained at 37°C. When confluent sheets of cells had been obtained, the serum-containing medium used to grow the cells was drained, and the cell sheets washed with phosphate buffered saline solution. Each bottle was inoculated with 20 ml. of a dilution of 1/10,000 in medium 199 of the Kunz strain of influenza A virus (which was stored in the form of high titre allantoic fluid virus). The bottles were incubated with rotation for a further 36–60 hours. The rate of growth of virus was followed by measuring the rate of formation of haemagglutinins. Approximately 12 hours after the time when the peak of haemagglutin formation had been reached, the bottles were removed from the incubator. The fluids from groups of 30 bottles were drained, pooled together and tested for freedom from bacterial and other contaminants. When these tests had been completed, all the pools were combined and passed through a porosity 3 sintered glass filter to remove cell debris. N/10 hydrochloric acid was added to bring the pH down to a level of 2. This degree of acidity was maintained for 24 hours, after which N/10 sodium hydroxide was added to restore the pH to 7. The acidxtreated product constituted the crude Interferon preparation. It was stored frozen at −20°C. It may be concentrated, as for example ten times by the process of freeze-drying or by other means.

EXAMPLE 5.

Tissue cultures were prepared in Roux bottles from cortical tissue isolated from the kidneys of monkeys. This tissue was cut into small pieces and suspended in medium 199 (Morgan et al., Proc. Soc. Exper. Biol. & Med. 73, 1–8) and digested at 37°C. with 0.25 percent trypsin for 1 hour. The cells were then washed by centrifugation in fresh medium 199 and suspended for the growth phase in medium 199 containing 2 percent horse serum. After seven days' incubation confluent first generation monolayer cultures were obtained. Each confluent culture was fluid changed with 100 ml. of medium 199 containing 2 percent $NaHCO_3$.

Kunz influenza virus was grown in fertile hens' eggs for 2 days and the allantoic fluid was used to seed the tissue cultures, 1 ml. of the virus fluid, which contained 4,000 haemagglutinating units being added to each Roux bottle. The cultures were incubated at 37°C. for 3 days when the fluids were harvested and adjusted to pH 2.0 by the addition of N/1 HCl (approximately 40 ml/litre). After three hours N/1 NaOH was added to bring the pH to 7.0. Haemagglutinin tests were negative. The fluids were dialysed against distilled water for 24 hours to lower the salt concentration. Gelatin was then added to give a concentration of 0.1 percent and the material freeze-dried.

EXAMPLE 6.

An inactivated seed virus was prepared by irradiating 3 ml. of allantoic fluid containing Kunz strain of influenza virus in a 4 in. Petri dish for 1 min., 7 cm. beneath a Phillips U.V. tube with a maximum emission at 2,537 A. The haemagglutinating capacity of the inactivated virus preparation was determined, and the fluid was used to seed monolayer tissue cultures obtained as in Example 5 at the rate of 12,000 haemagglutinating units per Roux bottle. After 48 hours incubation at 37°C. the fluids were harvested and dialysed against distilled water as in Example 1.

EXAMPLE 7.

The inactivated seed virus was prepared by the method given in Example 6.

The chorio-allantoic membranes were removed from fertile hens' eggs which had been incubated in a commercial incubator for 10 days. The membranes were washed and placed in 5 liter Povitsky bottles, (40 membranes in each bottle) containing 200 ml. of Earle's medium fortified with 500 $\mu$g. of benzyl-penicillin/ml. and 500 $\mu$g. of streptomycin sulphate/ml. The seed virus was added at the rate of 1,000 haemagglutinating units per membrane, and the bottles were incubated at 37°C. for 3 hours. The membranes were removed and washed in Earles's medium and transferred to 5 liter bottles containing 200 ml. of the same medium with added penicillin and streptomycin and rocked at 37°C. for 18 hours. The first fluid harvest was then taken and the membranes were reincubated as before for a second harvest. The culture fluid containing Interferon was clarified by centrifugation and concentrated by osmodialysis against polyethylene glycol.

EXAMPLE 8.

The method used was basically that described in Example 7 but allantoic fluid containing A/Singapore inflenza virus was used to seed the chick membranes. After incubation for 48 hours at 37°C. the fluids were harvested, acidified to pH 2 with N/1 NCl for 3 hours to destroy the live virus and then neutralized with N/1 NaOH This Interferon solution was subsequently clarified by centrifugation, tested for sterility and concentrated by osmodialysis.

EXAMPLE 9.

B/England strain of influenza virus was grown in fertile hens' eggs and the allantoic fluid containing the virus used in the production of Interferon in hens' eggs. The haemagglutinating titre of the allantoic fluid containing the virus was 1:4,000 per ml. 0.1 ml. portions of $10^{-3}$ dilution were inoculated into the allantoic cavities of fertile hens' eggs which had been incubated in a commercial incubator for 10 days. The eggs were then further incubated at 37°C. for 2 days. The allantoic fluid was then harvested, clarified by centrifugation and treated at pH 2 for 3 hours to inactivate the virus. After returning the reaction to pH 7.0 the Interferon was concentrated by freeze-drying.

EXAMPLE 10.

Melbourne strain influenza virus was inactivated as described in Example 6 and used to inoculate hens' eggs as described in Example 9. The eggs were incubated for 2 days at 37°C. The allantoic fluid was then harvested, clarified and concentrated.

EXAMPLE 11.

1. The Kunz strain of influenza A virus was grown in fertile hens' eggs. The allantoic fluid was diluted with medium 199 to contain 200–500 haemagglutination units of virus/ml.

2. Tissue Trypsinised rhesus monkey kidney tissue was added to nutrient medium consisting of 0.5 percent lactalbumen hydrolysate and 5 percent horse serum in Earle's saline contained in flat-sided bottles of about 520 ml. capacity, each bottle containing about $5 \times 10^6$ cells in 70 ml. of medium. The bottles were incubated for 5–6 days at 37°C. while a cell sheet developed. The nutrient medium was then decanted and the cell sheet was washed with an isotonic phosphate-buffered saline, pH 7.5.

3. Formation of Interferon. Each bottle received 0.5 ml. of the virus in medium 199, and a further 50 ml. of medium 199. The bottle containing the cell sheet and the virus was incubated for 3 days at 37°C. Some bottles received only 50 ml. of medium and no virus, and these served as controls.

4. Recovery and assay of Interferon. The supernatant containing Interferon was decanted from the cell sheet and tested for sterility and freedom from mycobacteria. Residual virus was inactivated by bringing the liquid to pH 2, storing for 24 hours at 4°C. and bringing back to pH 7. The solution of Interferon was also submitted to safety tests in eggs, in mice and in tissue cultures of rhesus monkey kidney, patas monkey kidney tissue and rabbit kidney, to ensure that it was fit for clinical use.

Cell debris was removed by filtration or centrifugation and the solution was then freeze-dried. For clinical use the freeze-dried material was reconstituted to give a solution ten times more concentrated in Interferon than before freeze-drying. Reconstituted solutions were assayed for Interferon activity, examined for toxicity and tested for sterility.

EXAMPLE 12.

Human thyroid cell cultures were prepared by mincing surgical specimens from cases of "goitre", trypsinising overnight at 4°C. in 0.25 percent Difco trypsin and growing the cells in medium 199 containing 10 percent calf serum. The agar overlay medium was composed of Earle's balanced salt solution containing Eagle's nutrients (Eagle, 1955), 0.5 percent lactalbumin hydrolysate, 15 percent skim milk, 1:30,000 neutral red, and 1.5 percent Noble's agar. All media contained 100 units/ml. of penicillin and streptomycin. Interferon was prepared by inoculation of these cultures with a $10^{-2}$ dilution of Newcastle disease virus and incubation at 36°C. for 2 days. At this time the cells appeared normal and the fluids were harvested and treated at pH 2 in order to destroy residual virus. The pH was lowered to 2 (red color of thymol blue) by adding 1/3 N hydrochloric acid in the presence of 1/100,000 thymol blue. The acidified fluid was poured into a fresh vessel and the pH raised to 7.8 (blue color of thymol blue) with 1/3 N sodium hydroxide. The product was an aqueous solution of Interferon.

What is claimed is:
1. Interferon.
2. Human interferon.
3. Monkey interferon.
4. Chick interferon.

* * * * *